March 16, 1948.  M. MALLORY  2,437,883

ENGINE GOVERNOR

Filed Sept. 7, 1945  2 Sheets-Sheet 1

INVENTOR
*Marion Mallory*

BY
*Barnes, Kisselle, Laughlin & Raisch*
ATTORNEYS.

INVENTOR
Marion Mallory

Patented Mar. 16, 1948

2,437,883

UNITED STATES PATENT OFFICE 2,437,883

ENGINE GOVERNOR

Marion Mallory, Detroit, Mich.

Application September 7, 1945, Serial No. 614,910

7 Claims. (Cl. 137—153)

This invention relates to a governor for an internal combustion engine.

It is the object of this invention to produce a speed governor for an internal combustion engine which can be adjusted to govern the engine to any desired speed and also adjust it to cause the governor valve to operate quickly so it will open to its full extent immediately upon slowing down of the engine, and to also adjust it so that the governor valve will open slower upon slowing down of the engine speed. For example, the operator can adjust the governor so that it is sharp loading or broad loading. Sharp, meaning rapid loading or opening of the governor valve; broad, meaning slow loading or opening of the governor valve.

A further object is to provide a governor that will be for universal adaptations without using different parts to change the functioning of the governor. In other words, in my governor the above functioning can be accomplished by mere adjustment.

Another object is to provide an engine governor utilizing the power of the suction from the intake of the engine to close the valve and a spring to open the governor valve and to connect the suction device to the governor valve in such a leverage position that when the governor valve starts to open from a closed position, the suction device gains leverage over the spring that opens the governor valve to prevent the spring from opening the governor valve too rapidly which would cause surging of the engine.

A still further object is to provide a governor closed by the intake suction of the engine and opened by a spring, means for moving the spring so the spring alone will hold the governor valve slightly toward a closed position so that when the engine is being governed at real low speed, the governor valve will be closed enough to maintain sufficient suction in the intake passageway (between the engine and governor valve) to start the governor valve to close.

Figure 3:
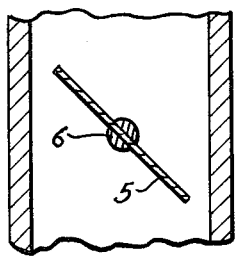
Figure 3:
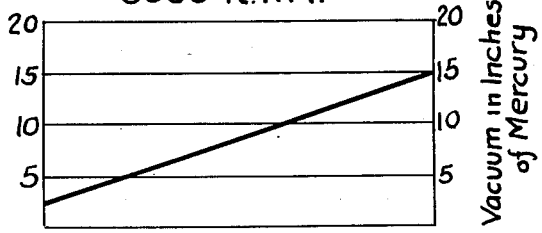
Figure 4:
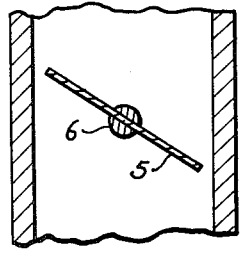
Figure 4:
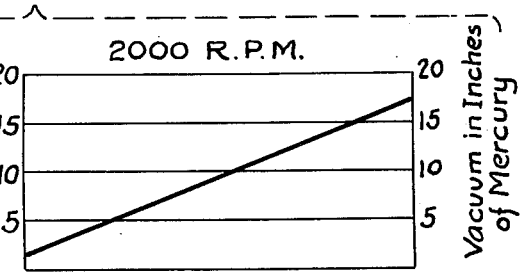
Figure 5:
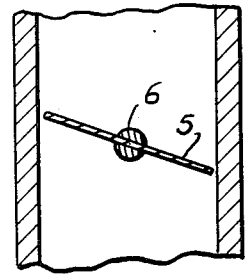
Figure 5:
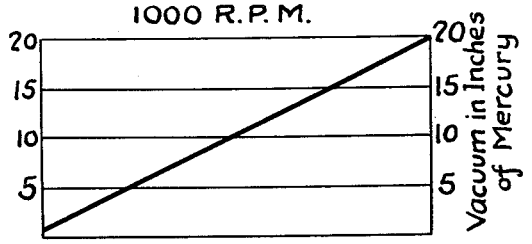

Figs. 3, 4 and 5 illustrate respectively the position of the throttle valve when the engine is running under no load at governed speeds of 3000 R. P. M., 2000 R. P. M. and 1000 R. P. M. and in juxtaposition to each throttle showing there appears a graph showing the decrease in vacuum in the intake passageway between the governor valve and the engine as the throttle moves from closed position to a wide open position.

The parts of my governor are as follows: engine intake passageway 1, inlet 2, outlet 3 to the engine, governor housing 4, governor throttle 5, throttle shaft 6, lever 7 fixed on throttle shaft 6, tension spring 8, post 9 on lever 7 to which one end of spring 8 is fastened, post 10 on plate 11 to which the other end of tension spring 8 is fastened, post 12 on housing 4 on which plate 11 is pivoted, gear teeth 13 on plate 11, pinion 14 meshing with teeth 13, arcuate slot 15 in plate 11, lock screw 16 having a screw fit in a wall of housing 4, suction device 17, suction chamber 18, flexible diaphragm 19, rod 20 connecting diaphragm 19 with lever 7 as at 21, conduit 22 connecting suction chamber to orifices 23 and 36 in the intake passageway.

Orifices 23 and 36 and suction chamber 18 are preferably air bled through a centrifugally unbalanced air bleed mechanism comprising conduit 24, engine driven shaft 25, housing 26, circumferential passageway 27 communicating with conduit 24 and with T passageway 28 in shaft 25, valve housing 29, centrifugal valve 30, tension spring 31, bypass passageway 32, air bleed orifice 33, outlet to atmosphere 34, adjusting needle 35 for orifice 23, and orifice 36.

Figure 1:
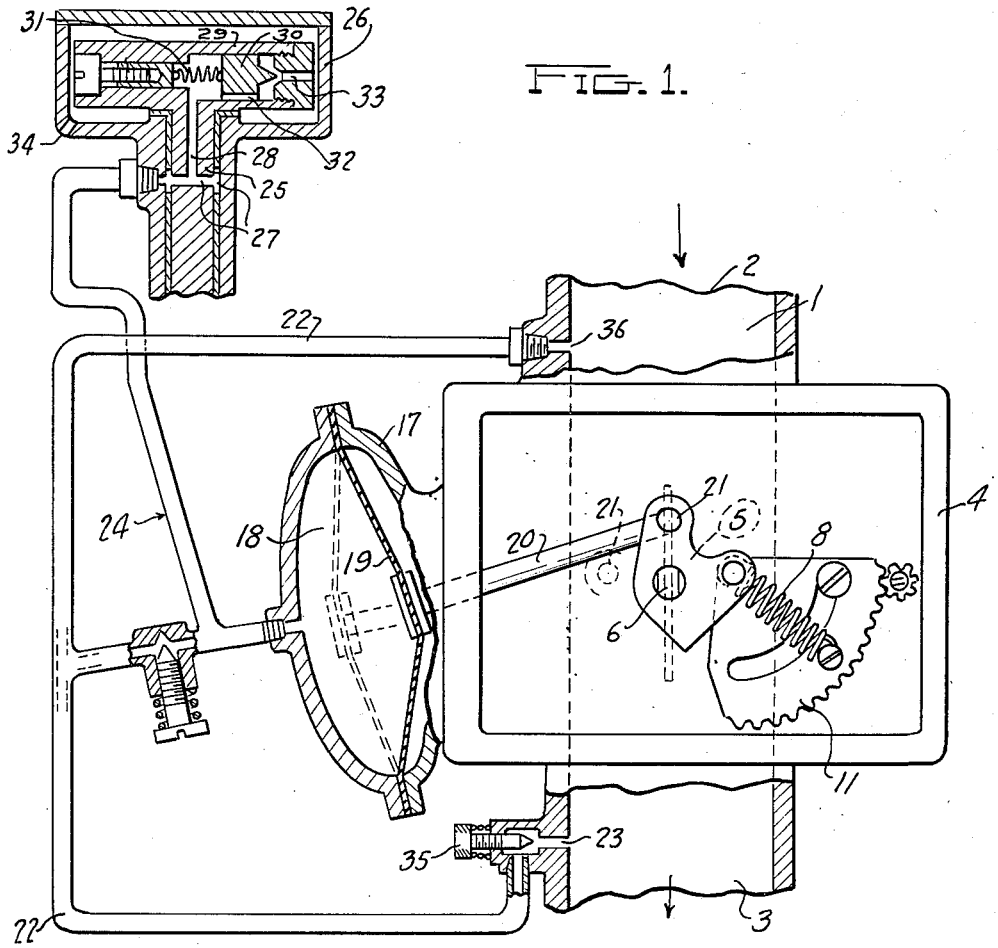
Fig. 1 is a sectional view showing my governor.

The operation of my governor is as follows: Assuming the governor valve 21 is wide open, as shown in Fig. 1, the engine will receive a full charge until it reaches a speed that piston valve 30 closes orifice 33. It will be understood that when piston valve 30 is out of orifice 33, orifices 23 and 36 will be bled to the atmosphere which in turn nullifies the power of the suction device, permitting spring 8 to hold the valve 21 wide open, and, of course, as stated, when the engine reaches the governor cutoff speed, piston 30 will close orifice 33 and the vacuum immediately builds up in the suction device causing governor valve 21 to move toward a closed position. In the event more load was applied to the engine, or the vehicle should come to a hill, the engine will start to slow down slightly and piston 30 will start to move out of orifice 33 air-bleeding the suction device and permitting spring 8 to open the governor valve. If the governor valve does not open fast enough or the governor is too broad, spring perch 11 can be moved downwardly by loosening screw 16 and turning gear 14 counterclockwise. When the spring is moved downwardly not only the leverage of the spring is increased over the suction device but the tension of the spring is increased due to the fact that the distance between spring posts 9 and 10 increases as spring post 10 is moved downwardly because the spring perch 11 is pivoted around post 12 in such a manner to cause the spring to gain leverage and to increase the distance between posts 9 and 10 as spring perch 11 is moved downwardly and to decrease the tension of the spring and decrease the leverage over the suction device as the spring perch is moved upwardly.

Due to the fact that the velocity through intake passageway or vacuum created at orifices 23, 36 is not as high when the throttle valve 5 is open and the engine operating at low speeds as it is when the throttle 21 is open and the engine is operating at high speeds, and due to this lower vacuum, there is not enough power to start the governor valve to close early enough when the engine is being governed at real low speeds. There would be considerable overrun if the governor spring perch was located as shown in Fig. 1 and the engine was being governed at real low speeds because the suction at orifices 23 and 36 would never reach a point to overcome the spring leverage and high tension of spring until far above closing speed of valve 30. In other words, valve 30 might close orifice 33 at 1000 R. P. M. engine speed and shut off the air bleed but there would not be enough suction in intake passageway to start governor valve toward closed position. The engine would perhaps have to reach 2000 R. P. M. speed to create enough suction at orifices 23 and 36 to start the governor valve toward closed position. However, after it had started toward closed position, the vacuum would rapidly increase at orifice 23 and close the governor valve which would bring the engine speed down to 1000 R. P. M. or at the closing speed of valve 30 but there would be 1000 R. P. M. overrun and, naturally, the governor would cause the engine to surge near wide open throttle because when load was applied and governor valve started to open, the engine would lose all its vacuum and if the spring was set in position, as shown in Fig. 1, the governor valve would fly open immediately. The engine speed would run up far above the governor speed or until the vacuum built up high enough in the intake passageway to start the valve to close. The valve would then close rapidly and the engine speed would sink rapidly, resulting in surging, perhaps, from 1000 R. P. M. to 1500 or 1800 R. P. M.—up and down. To overcome this condition, spring perch 11 is moved upwardly into the position shown in Fig. 2. The tension is low and the leverage over the suction device is low and the valve 21 will be slightly tilted which will give sufficient vacuum at orifice 23 to start the valve toward closed position as soon as valve 30 closes, naturally, preventing the engine from overrunning the governed speed of 1000 R. P. M., i. e., the closing speed of piston 30.

Figure 2:
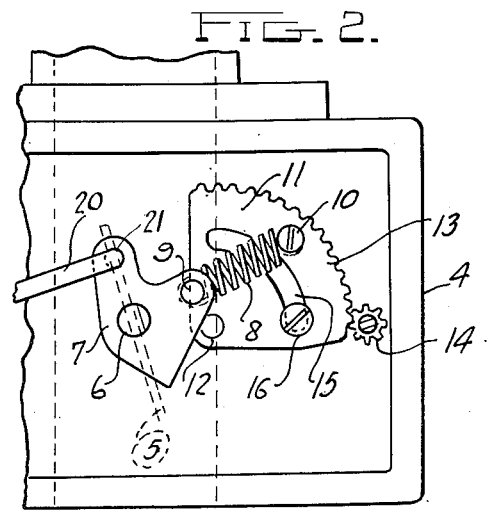
Fig. 2 is a fragmentary sectional view showing my governor with the spring adjusted to a different position from that shown in Fig. 1.

In the event the governor is being governed at high engine speed, there is sufficient vacuum created by the velocity past orifices 23 and 36 to start the valve 5 to close immediately when piston valve 33 closes. Even though valve 5 is wide open, there is sufficient vacuum at high speeds to start it to close and due to this vacuum being high, there is considerable vacuum existing in the suction device even though piston valve 30 starts to open when the engine speed starts to slow down, and this slight amount of existing vacuum in the suction device tends to delay the opening of valve 5. Therefore, it is necessary to increase the leverage of the spring over the suction device as well as increase the tension of it to cause the valve to open rapidly at high speed. Of course, it will be understood that even though the tension of, and leverage spring 8 has over suction device is low, as shown in Fig. 2, valve 5 will open fast enough when governed at real low speed because when it is open at low speed, the velocities are low between orifices 36 and 23 and this vacuum is practically nullified by the piston moving out of orifice 33.

It can be seen in Fig. 1 that when the throttle valve is wide open, the suction device has the greatest leverage over the spring 8 and, as the valve starts toward a closed position, the suction device begins to lose leverage over spring 8. This is very essential because when the governor valve starts to open, the vacuum at orifice 33 drops very rapidly causing a rapid drop in power of the suction device and if it were not that the suction device gaining leverage over the spring as valve 5 moved toward an open position, valve 5 would fly open rapidly due to the rapid drop in vacuum. This would cause the governor to load too sharp and surge.

When the engine is to be governed at low speed, adjusting screw 35 is turned inwardly to restrict orifice 33. This prevents the vacuum from building so high in the suction device when throttle 5 is closed because as the restriction is increased at 23, orifice 36 effects a greater air-bleeding of orifice 23. However, by restricting orifice 23 for low engine speed, the governor valve will still start to close as soon as piston valve 30 closes orifice 33 due to the fact that the suction between the throttle and the engine at orifice 23 is sufficient to start the governor valve to close when the spring perch is adjusted to hold valve 5 in the position shown in Fig. 2.

By reference to the graphs shown in Figs. 3, 4 and 5, it can be seen that the method of moving spring 8 to change both tension and leverage as well as the adjustment of orifice 23 are very essential to adjust the governor to give the performance at all governed speeds that are desired of the governor. It will be seen by the graphs that when the engine is governed at 1000 R. P. M. no load, the suction is higher than when the engine is governed at 3000 R. P. M. no load. By adjusting valve 35 inwardly the vacuum in suction chamber 18 at 1000 R. P. M. no load can be brought down to the same vacuum as will exist in suction chamber 18 at a governed engine speed of 3000 R. P. M. no load. This prevents governor valve from plastering closed and causing the governor valve to delay in opening when load is applied to the engine and then opening wide after breaking loose from its plastered or closed position to cause surging of the engine speed beyond its governed speed. It can also be seen from Figs. 3, 4 and 5 that when governing the engine at 1000 R. P. M. full load or wide open throttle the vacuum at orifices 23 and 36 is only about one inch of mercury whereas when the engine is governed at 3000 R. P. M. the vacuum at orifices 23 and 36 is two and one-half inches of mercury at wide open throttle. Naturally a spring with more tension and leverage is required to overcome the two and one-half inches vacuum and hold governor valve open so the engine can receive a full charge. When governing the engine at 1000 R. P. M. the vacuum is not high enough at orifices 23 and 36 to start governor valve closed even though valve 30 has closed orifice 33. Therefore, it is necessary to move spring 8 to the position shown in Fig. 2 so a vacuum will be created at orifice 23 equivalent to what the vacuum was at orifices 23 and 36 when the engine was governed at 3000 R. P. M. with the governor throttle valve wide open. The engine breathing is not restricted any more when being governed at low speed than when being governed at high speed even though the governor valve is slightly tilted toward a closed position. This is substantiated by the fact that the vacuum between the governor valve and the engine at high speed governing and low speed governing

I claim:

1. A governor for an internal combustion engine having an intake passageway, comprising a throttle valve controlling the flow of motive fluid through said intake passageway, a device actuated by changes in pressure in the intake passageway on the intake passageway outlet side of said valve for imparting movement to said throttle valve, said pressure actuated device tending to move said throttle valve toward closed position in response to a fall in said intake passageway pressure, a valve shaft for supporting said valve, a lever on said shaft, and resilient means connected to said lever tending to open said throttle valve, said resilient means being constructed and arranged for continuously gaining leverage over said throttle valve as it moves toward closed position, said resilient means comprising a spring and an anchor for one end of said spring pivoted eccentrically of said throttle valve shaft and the other end of said spring being connected to said lever whereby pivoting of said anchor changes the tension of said spring.

2. A governor for an internal combustion engine having an intake passageway, comprising a throttle valve controlling the flow of motive fluid through said intake passageway, a device actuated by changes in pressure in the intake passageway on the intake passageway outlet side of said valve for imparting movement to said throttle valve, said pressure actuated device tending to move said throttle valve toward closed position in response to a fall in said intake passageway pressure, a valve shaft for supporting said valve, a lever on said shaft, and resilient means connected to said lever tending to open said throttle valve, said resilient means being constructed and arranged for continuously gaining leverage over said throttle valve as it moves toward closed position, said resilient means comprising a spring and an anchor for one end of said spring pivoted eccentrically of said throttle valve shaft and the other end of said spring being connected to said lever whereby pivoting of said anchor changes the tension of said spring, the pivotal mounting of said spring anchor being such that when the anchor is adjusted so that the anchor is above a line passing through the center of the shaft and the pivot for said anchor the spring coacts with the lever to hold the throttle valve in partly closed position whereby governing of the engine at low speeds without overrun is facilitated.

3. A governor for an internal combustion engine having an intake passageway, comprising a throttle valve controlling the flow of motive fluid through said intake passageway, a device actuated by changes in pressure in the intake passageway on the intake passageway outlet side of said valve for imparting movement to said throttle valve, said pressure actuated device tending to move said throttle valve toward closed position in response to a fall in said intake passageway pressure, a valve shaft for supporting said valve, a lever on said shaft, an anchor pivoted eccentrically of said valve shaft, a spring mounted between said anchor and said lever, means for adjusting the tension of said spring by swinging the spring anchor about its pivot and setting the anchor in said adjusted position whereby the anchor can be adjusted at one position so that the spring holds the throttle valve in partly closed position whereby governing of the engine at low speeds is facilitated and said anchor can be adjusted to another position where the tension of the spring is increased and governing of the engine at high speeds is facilitated.

4. In an internal combustion engine having an intake passageway and a throttle valve controlling the flow of motive fluid through said passageway, a valve shaft for supporting said valve, an anchor pivoted eccentrically of said valve shaft, resilient means mounted between said anchor and said valve shaft whereby adjusting of the anchor about its pivot changes the stress of said resilient means and consequently the force applied by said resilient means to said throttle valve.

5. In an internal combustion engine having an intake passageway and a throttle valve controlling the flow of motive fluid through said passageway, a valve shaft for supporting said valve, an anchor pivoted eccentricaly of said valve shaft, a lever secured to said valve shaft, and resilient means mounted between said anchor and lever whereby said anchor can be adjusted about its pivot to thereby move the point of connection of said resilient means with said anchor relative to the point of connection of said resilient means with said lever to vary the leverage which said resilient means has over said valve shaft and also to vary the stress of said resilient means.

6. The combination as set forth in claim 5 including means constructed and arranged for adjusting said anchor about its pivot and setting the same in adjusted position.

7. The combination as set forth in claim 5 wherein the resilient means is a tension spring one end of which is connected to said anchor and the other end of which is connected to said lever, and means constructed and arranged for adjusting said anchor about its pivot to vary the tension of the spring and to vary the leverage of the spring over said valve shaft.

MARION MALLORY.

REFERENCES CITED

The following references are of record in the file of this patent:

UNITED STATES PATENTS

| Number | Name | Date |
|---|---|---|
| 2,052,401 | Klemm | Aug. 25, 1936 |
| 2,209,421 | Sarnes | July 30, 1940 |
| 2,367,606 | Olson | Jan. 16, 1945 |